Figure 1:
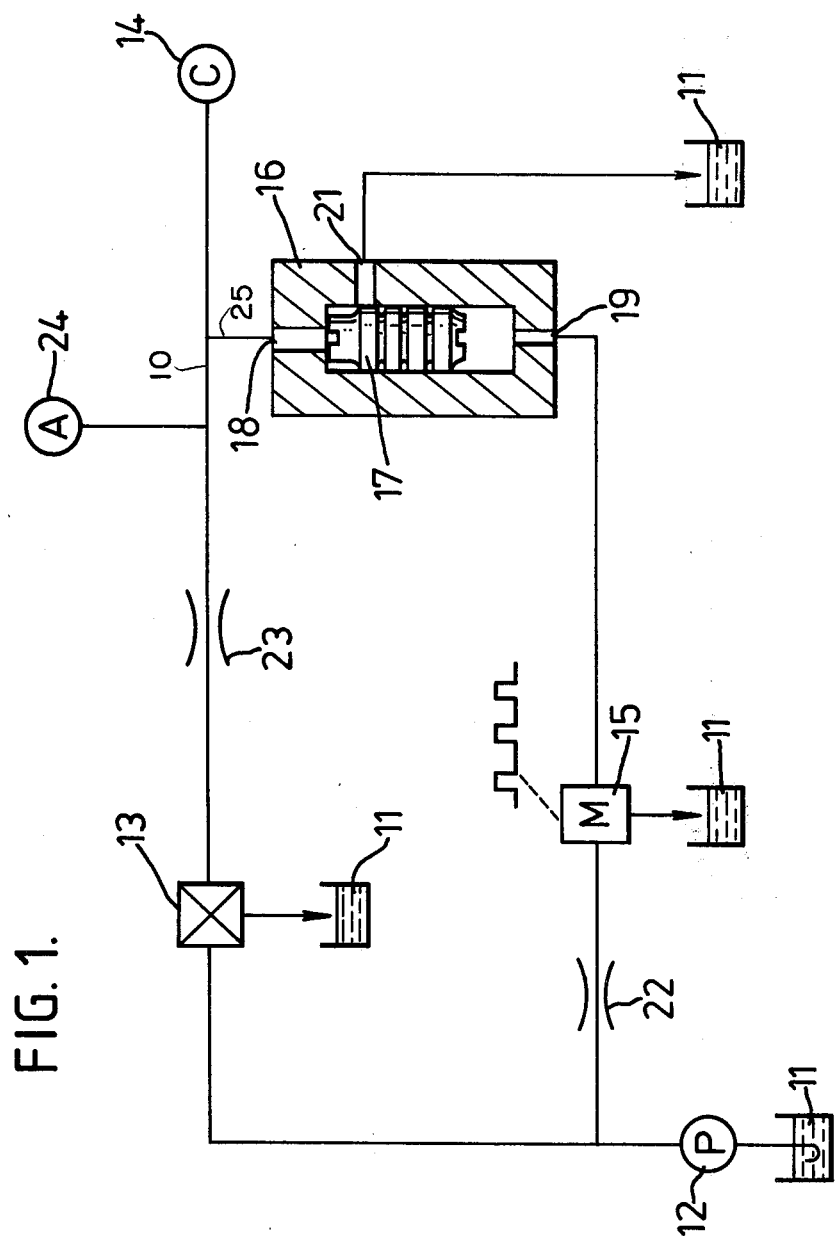

United States Patent [19]
Parsons

[11] 4,444,297
[45] Apr. 24, 1984

[54] CONTROL SYSTEM FOR A FLUID PRESSURE ENGAGED CLUTCH

[75] Inventor: David Parsons, Kenilworth, England

[73] Assignee: Automotive Products Limited, Leamington Spa, England

[21] Appl. No.: 319,325

[22] Filed: Nov. 9, 1981

[30] Foreign Application Priority Data

Nov. 27, 1980 [GB] United Kingdom ............... 8038034

[51] Int. Cl.³ .............................................. F16D 43/28
[52] U.S. Cl. .................................. 192/3.58; 192/109 F
[58] Field of Search ................. 192/3.57, 3.58, 109 F, 192/109 D, 0.096, 0.07, 0.075, 0.076

[56] References Cited

U.S. PATENT DOCUMENTS

| | | | |
|---|---|---|---|
| 3,004,447 | 10/1961 | Sand | 192/109 F |
| 3,025,717 | 3/1962 | Christenson | 192/109 F |
| 3,583,422 | 6/1971 | Dach et al. | 192/109 F |
| 3,674,121 | 7/1972 | Copeland | 192/109 F |

FOREIGN PATENT DOCUMENTS

| | | |
|---|---|---|
| 863815 | 3/1957 | United Kingdom . |
| 1208193 | 10/1970 | United Kingdom . |
| 1261956 | 2/1972 | United Kingdom . |
| 1314372 | 4/1973 | United Kingdom . |
| 1424735 | 2/1975 | United Kingdom . |
| 1483545 | 8/1977 | United Kingdom . |
| 2039335 | 8/1980 | United Kingdom . |
| 1270890 | 4/1982 | United Kingdom . |

Primary Examiner—George H. Krizmanich
Attorney, Agent, or Firm—Kemon & Estabrook

[57] ABSTRACT

Fluid pressure for engagement of a clutch is controlled by a valve alternating between supply and drain conditions in response to a high frequency electrical square wave signal. The valve produces a low flow pilot pressure signal which controls clutch engagement pressure through a valve incorporating a piston which allows clutch engagement pressure to drain whenever that pressure exceeds pilot pressure.

4 Claims, 1 Drawing Figure

CONTROL SYSTEM FOR A FLUID PRESSURE ENGAGED CLUTCH

This invention relates to fluid pressure engaged clutches for motor vehicle transmissions.

In such transmissions fluid pressure engaged clutches are provided to transmit driving torque from an input to an output. Such clutches are frequently employed to effect a dynamic ratio change from one speed ratio to another. It is important that the rate of clutch engagement of these clutches be adaptable to suit differing transmission operating conditions. For example, the clutch engagement conditions for a lightly loaded vehicle moving downhill are very different from those of a heavily loaded vehicle moving uphill.

It is known to alter the rate of clutch engagement and the final engagement pressure in accordance with vehicle throttle opening. Such modulation has in the past been effected by a variety of hydro-mechanical devices to achieve a range of clutch control. These devices have seldom been wholly successful due to the build up of mechanical and hydraulic manufacturing tolerances.

It has been proposed to include a closure valve in the clutch feed line, the valve being electrically switched at high frequency between supply and drain conditions to create the desired clutch pressure. The electrical signal is preferably of square wave form and its mark to space ratio is varied to control the energisation time of the valve as a proportion of the signal period. Dependent on the mark to space ratio such as high frequency signal has the effect of maintaining the valve at any desired part-open condition and the valve has a fast and accurate response to signal changes. The absolute opening and rate of change of opening of the valve can thus be precisely controlled.

It is a disadvantage of such valves when used in this way that, in order to pass the high flow rates of fluid necessary for clutch operation, the valves themselves must be large and are consequently space consuming. Furthermore, they are expensive and have a high power requirement.

A subsidiary disadvantage is that pressure pulses from such valves can affect the smooth operation of the clutch.

The present invention seeks to provide an improved control system which overcomes the aforementioned disadvantages.

According to the invention there is provided clutch control means for location between a fluid pressure source and hydraulic actuation means for a clutch, and comprising pilot pressure means responsive to an electrical drive signal to provide a pilot pressure as a proportion of source pressure and control valve means including a drain outlet whose opening is controlled by piston means open at one side to pilot pressure only and at the opposite side to pressure in the hydraulic actuation means only such that said drain outlet is connected to relieve pressure in said hydraulic actuation means whenever that pressure exceeds pilot pressure.

Preferably said pilot pressure means comprise a valve to alternate between supply and drain conditions in response to an alternating drive signal, the mark to space ratio of said signal controlling the supply condition of said valve as a proportion of signal period to vary pilot pressure as a proportion of source pressure.

Other features of the invention are included in the following description of a preferred embodiment shown, by way of example only, in the accompanying drawing which is a schematic illustration of a hydraulic control circuit according to the invention.

With reference to the drawing there is shown a hydraulic circuit for controlling engagement of a fluid pressure actuated clutch of a motor vehicle transmission.

There is provided a reservoir 11 from which a pump 12 supplies fluid under pressure through a three-way solenoid-operated valve 13 through connection 10 constituting supply means to the actuating chamber of a clutch 14. The valve 13 is normally open to drain but on energisation connects the pump outlet to the clutch actuating chamber. The pump 12 may supply other fluid pressure users.

A pilot pressure valve means 15, supplied with fluid under pressure from the pump, is responsive to an electrical square wave signal of variable mark to space ratio to dump a proportion of the pump delivery to the reservoir. The establishment of electrical square wave signals having a variable mark to space ratio representating a desired clutch actuation pressure is well known in the art and is utilized for example in U.S. Pat. No. 4,116,321 to Miller dated Sept. 26, 1978 wherein said variable mark to space ratio square wave signal is referred to as a pulse width modulated signal. The present invention is concerned with the utilization of such a signal to control a clutch and not with the establishment, per se, of electrical square wave signals. Fluid pressure upstream of the valve means 15 is dependent on the opening of the valve means which is in turn dependent on the mark to space ratio of the electrical square wave signal.

A throttle valve 16 includes a bore having a piston 17 slidable therein. Inlet ports 18 and 19 provide for the opposed ends to the piston to be exposed respectively to fluid pressure in the clutch actuating chamber through a branch connection 25 leading from supply means 10 and to pilot pressure from the pilot pressure valve means 15. A drain port 21, whose opening is controlled by the piston 17, is connectable to the inlet port 18.

Fluid flow restriction 22 is provided to maintain a minimum pump pressure whilst the valve 15 is in the drain condition. Restrictor 23 and accumulator 24 smooth out engagement of the clutch 14.

Operation of the control circuit is as follows:

The pump 12 is running and both valves 13 and 15 are in the drain condition.

Slightly before the solenoid-operated valve 13 is opened to engage the clutch 14, the closure valve 15 is supplied with the electrical signal having a mark to space ratio indicative of the desired clutch operating pressure and operates to provide an equivalent pilot pressure at the inlet port 19.

Operation of the solenoid valve 13 connects the pump 12 to the clutch 14 which engages as the fluid is supplied to the clutch from the pump. Clutch actuating pressure also acts at inlet port 18 of the throttle valve 16 against the effect of pilot pressure.

Should clutch actuating pressure exceed pilot pressure, piston 17 will shift to connect inlet port 18 with drain port 21. Piston 17 will shift back to close the drain port when a slight differential in favour of pilot pressure exists.

Should it be necessary to alter the clutch actuating pressure this can rapidly be achieved by changing the mark to space ratio of the electrical signal to the pilot pressure valve means 15 to regulate the pilot pressure and hence clutch actuating pressure accordingly.

Thus the clutch actuating pressure is accurately and economically regulated by the pilot pressure valve means 15 in conjunction with the throttle valve 16. The pilot pressure valve means needs only a very small flow capacity and can thus be of small size and economical construction.

Although the throttle valve is shown as having a constant diameter piston, a differential diameter piston and the inclusion of springs to load the piston in one direction or the other are not precluded from the scope of the invention.

I claim:

1. Clutch control means to regulate fluid pressure in hydraulic actuation means for a clutch under the control of an electrical signal indicative of a desired clutch operating pressure and comprising:

a fluid pressure source;

pilot pressure means connected to said fluid pressure source and responsive to said electrical signal to provide a pilot pressure as a proportion of source pressure;

supply means for supplying fluid from said source to said hydraulic actuation means, a branch connection leading from said supply means; and control valve means comprising:

a body having a bore therein, a piston reciprocal in the bore and having one side thereof connected to said pilot pressure means and exposed only to pilot pressure and the opposite side thereof connected to the branch connection and exposed only to pressure in said supply means as applied to said actuation means; and a drain port whose opening is controlled by said piston such that the drain port is connected to relieve pressure in said branch connection, supply means and hydraulic actuation means whenever that pressure exceeds pilot pressure.

2. Clutch control means according to claim 1 comprising an openable and closable valve in said supply means and interposed between said fluid pressure source and said branch connection.

3. Clutch control means according to claim 1 wherein said pilot pressure means is a valve responsive to variable mark to space ratio electrical signals.

4. Clutch control means according to claim 1, wherein said piston has equal opposite effective areas exposed to hydraulic pressure.

* * * * *